United States Patent [19]

Wurst et al.

[11] Patent Number: 5,015,083

[45] Date of Patent: May 14, 1991

[54] AIRCRAFT VISION AUGMENTATION SYSTEM WITH ADJUSTABLE EXTERNAL MIRROR AND COCKPIT MIRROR

[75] Inventors: Stephen G. Wurst, Orange; Kaori E. Matsunaga, Hawthorne, both of Calif.

[73] Assignee: Rockwell International Corporation, El Segundo, Calif.

[21] Appl. No.: 522,487

[22] Filed: May 14, 1990

Related U.S. Application Data

[63] Continuation of Ser. No. 354,049, May 19, 1989, abandoned.

[51] Int. Cl.5 .................. G02B 23/08; G02B 27/14
[52] U.S. Cl. ........................... 350/618; 350/174
[58] Field of Search ............... 350/618, 623, 624, 602, 350/604, 622, 174, 540-544

[56] References Cited

U.S. PATENT DOCUMENTS

| 1,365,247 | 1/1921 | Kennedy | 350/622 |
| 1,672,559 | 6/1928 | Doble | 350/623 |
| 1,768,191 | 6/1930 | Crook | 350/624 |
| 2,384,540 | 9/1945 | Flint | 350/542 |
| 2,674,921 | 4/1954 | Williams | 350/623 |
| 3,697,157 | 10/1972 | Pizzimenti et al. | 350/623 |
| 4,161,352 | 7/1979 | Felix et al. | 350/623 |
| 4,561,733 | 12/1985 | Kreischer | 350/602 |

FOREIGN PATENT DOCUMENTS 296862 1/1916 Fed. Rep. of Germany ...... 350/623

Primary Examiner—Jon W. Henry
Attorney, Agent, or Firm—Charles T. Silberberg; Lawrence N. Ginsberg; Harold C. Weston

[57] ABSTRACT

An array of plane mirrors allows forward view of space volumes normally obscured by craft structure without the use of forward facing transparencies. In submerged cockpit aerospace craft, such a system may utilize a deployable upper mirror to reflect such space volumes onto a control mirror for the pilot's use in takeoff and landing operations, allowing the pilot the same visual cues as would be available through a forward facing transparency in front of an apaprent eye position external to the cockpit.

5 Claims, 6 Drawing Sheets

AIRCRAFT VISION AUGMENTATION SYSTEM WITH ADJUSTABLE EXTERNAL MIRROR AND COCKPIT MIRROR

This is a continuation of copending application(s) Ser. No. 354,049 filed on 5/19/89, now abandoned.

BACKGROUND OF THE INVENTION

This invention relates to augmented vision systems, and in particular to a front view mirror system wherein an elevated plane mirror reflects a field of view to a lower mirror for use by an operator so positioned that he has no direct "line of sight" access to that field of view essential to success of his operating function.

Modern high speed ultrasonic aircraft and transatmospheric space vehicles depend in large part on transparencies (viz. "windows") for visual cues to the craft commanders charged with piloting the vehicles to conventional runway landings. Streamlining of these crafts' mold lines calls for shallow impact angles on external surfaces and minimal disturbances to flow lines for efficient flight in the atmosphere. This feature of long shallow surfaces and minimal flow line disturbance would require large areas of conventional transparencies for even marginal line of sight access by the pilot to runway surfaces and navigation aids such as beacons and strobed cues. Transparencies are heavier and bulkier than the stronger composites or special high temperature metals use for craft structure and they are less able to contain harmful radiation and reject thermal energy than conventional structural materials. Long, sloping areas necessary to preserve stream lines for forward facing transparencies also compromise optical quality of presentations to crewmembers (viz. "the pilot").

Under constrains of minimizing weight and preserving stream lines, providing a pilot with "out-the-window" vision has become a major design criterion for modern hypersonic aircraft. The current Concorde supersonic transport provides such visibility to its crew through a "droop-nose" arrangement whereby the nose section, forward of the cockpit and flight crew, is hinged downward during its low speed takeoff and landing operations. Rockwell International's XB-70 incorporated a long windshield ramp covering its main forward transparency to preserve streamlines and provide the necessary line-of-sight access of the pilot to his craft's runways when the covering is removed. X-15 hypersonic test vehicles incorporate moveable canopies to provide their pilots visual access to outside scenes of interest while preserving craft streamlines in high speed flight.

The latter two installations were designed to provide compliance with MIL-STD-850, Aircrew Station Vision Requirements for Military Aircraft, which standards are similarly met by the SST, Concorde, a commercial transport, design. For next generation hypersonic, trans-atmospheric space vehicles and high Mach number military fighter craft, the above solutions to vision satisfaction problems are not applicable. High aerodynamic loads, thermodynamic considerations and weight penalties associated with transparencies in structure negate the most basic of considerations that must be made.

Alternatives to direct view systems include periscopes, radar, television cameras, focal plane sensors and others, none of which provides the "feel" required by pilots for guiding their craft at up to 200 miles an hour onto concrete runways only a few craft lengths in width.

Search of the art has failed to provide cues to the system proposed herein where over the nose visibility of highly streamlined craft is achieved with minimal use of transparencies in craft structure.

lo provide transparency quality visibility to pilots of "submerged" cockpit aerospace craft, a combination of two plane mirrors is employed wherein an upper unit is mounted above a reduced area transparency to reflect a forward view of the craft's track to a second plane mirror on the pilot's control console, FIG. 1. The upper mirror is oriented normal to a selected field of view over the vehicle's nose structure and is raised to its operating position by any convenient mechanism providing for its retraction in high speed flight, with preservation of stream lines and reduced frictional resistance. A scene from the upper mirror is reflected down to the pilot's console unit which, in turn, reflects this view to the pilot. Due to the geometrical relationship between the two mirrors, the view seen is not from the vantage point of the actual eye position out is from an "apparent" eye (the virtual eye of the external mirror) location just aft of the external mirror as shown in FIG. 2. The actual angular relationship between the pilot and the viewed objects is, as a result, off normal by only a small parallax factor.

The scene/image provided by the mirrors presents a valid, "one to one" correlation between the pilot's presentation on the lower mirror and the actual external environment. Images appear on the cockpit mirror, not only at the proper size and distance, but also at their proper spatial orientation with respect to the vehicle and each other. Thus, if the aircrewman looks four degrees left and two degrees low, he sees whatever is actually four degrees left another two degrees low of his aircraft. He is able to expand his field of view by leaning in any direction as he would with a full size transparency with no sacrifice of clarity, spatial orientation or apparent image size.

Such a system provides a high resolution, undistorted three dimension color image of the vehicle's forward motion track. The design and geometry of the optics is simple in the extreme, using existing technology and requiring little development to adapt to different flight vehicles or terrestrial units with similar control problems. Its mirrors provide an accurate, real-world image which appears to the pilot as one viewed from the vantage of the "apparent eye" position. All cues for depth perception are intact. The mirrors can be used in conjunction with small side windows so that the pilot's view would be a panoramic composite of the forward space volume.

Minor modifications to the console ("lower") mirror for semi transparency could provide for presentation of flight instrumentation overlying the craft's approach view, i.e. a heads-Up-Display or HUD.

Accordingly, it is an object of this invention to provide the pilot of a hypersonic aerospace craft, operating in a submerged cockpit, with a real-time, real-world, three dimensional view of space over the nose of his craft, while preserving craft streamlines at high speed flight and minimizing use of transparencies in craft structure.

A further advantage of the vision augmentation system is to increase pilot safety through minimizing bird strike danger through his placement in a submerged cockpit, with minimal transparencies, while retaining three dimensional cues for landing and takeoff procedures. The reduced transparency surface area also decreases the vehicle's observable "signature", simplifying the need for protective radar and laser coatings.

SUMMARY OF THE INVENTION

The augmented vision equipment of this invention comprises a simple array of plane mirrors, so mounted on a moving vehicle as to provide the operator with a direct view of his forward track without the need for a forward facing transparency. Proper design and placement of one of the mirrors, external to the operator's cockpit and facing forward, allows the forward track of the vehicle to be reflected through an associated transparency port down to a corresponding lower plane mirror mounted convenient to the operator in his operating compartment. In high speed aerospace craft, this external mirror is held submerged in the fuselage at high operational speeds and is deployed in a suitably faired or streamlined module at low speeds, such as those of takeoff and landing. Vehicle instrumentation can be presented on the lower mirror face as a HUD while providing the advantages of three dimensional visual stimuli simultaneously to the pilot.

BRIEF DESCRIPTION OF THE DRAWINGS

FIGS. 9(a) & (b) illustrate embodiments of the invention for use in armored vehicles and high speed race cars.

DETAILED DESCRIPTION OF PREFERRED EMBODIMENT

Figure 1:
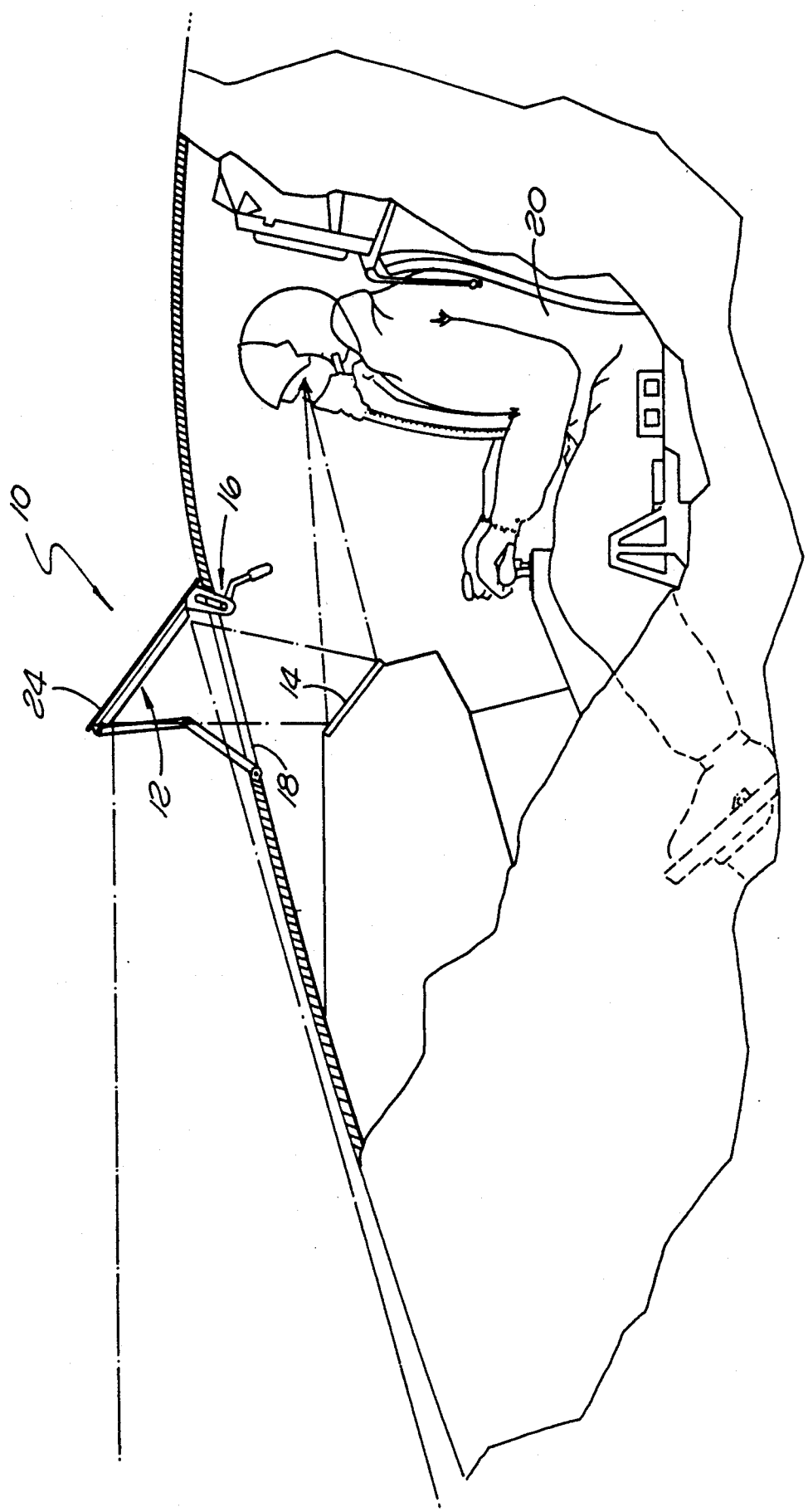
FIG. 1 is a sectional side view of a vision augmentation system showing its external mirror deployed for low speed operation.

FIG. 1 presents the overall arrangement 10 of the vision augmentation system, VAS, of this invention. The pilot 20 of a high performance aerospace plane is shown at the controls of his craft with a pair of mirrors, external mirror 12 and lower mirror 14 so arranged as to reflect the scene forward of the craft from upper mirror 12 to lower mirror 14 where it is utilized for visual cues to control the craft.

Figure 4:
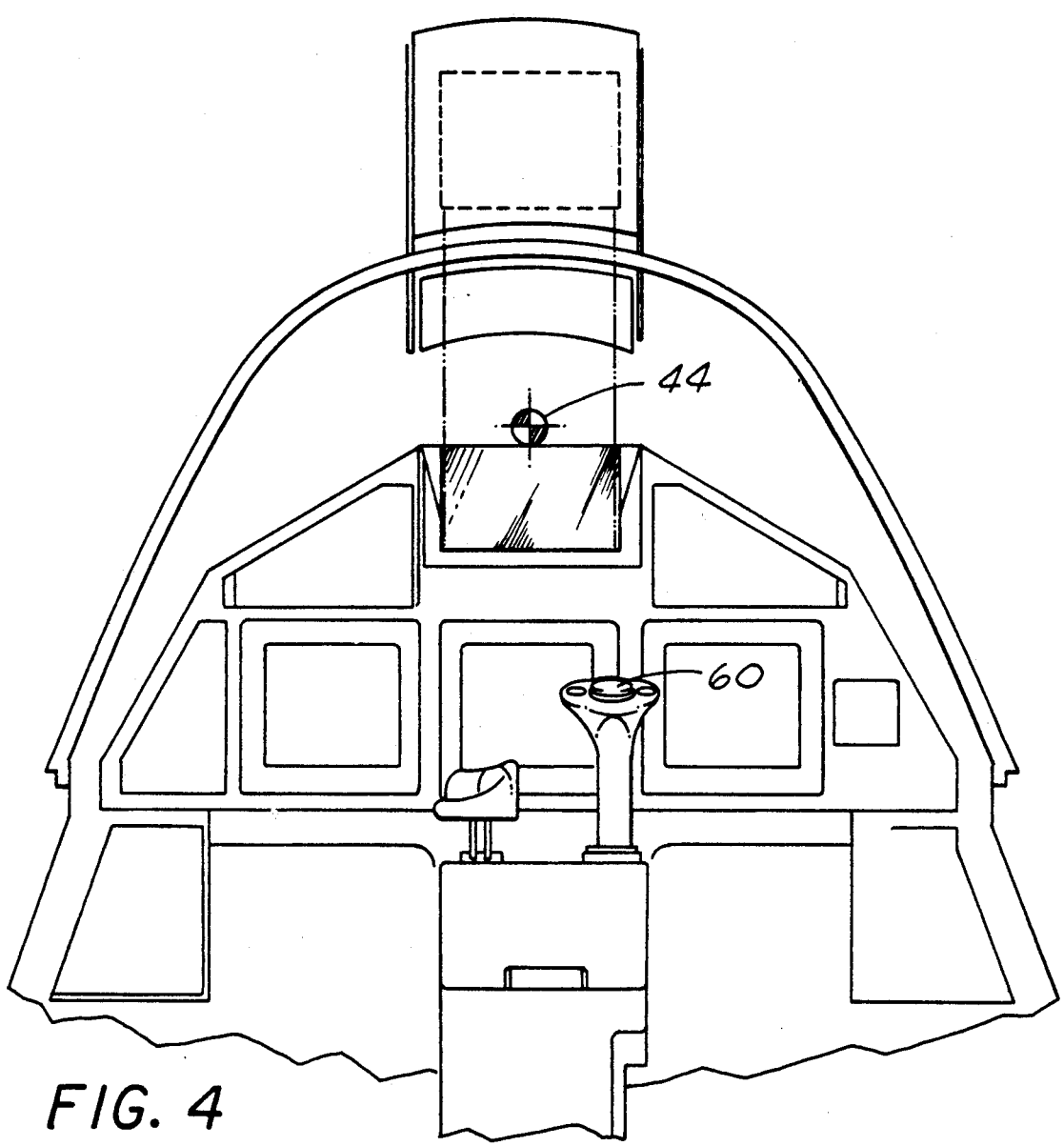
FIG. 4 is a forward looking view of the vision augmentation system for a tandem or single seat aircraft.

Mirrors 12 and 14 are approximately parallel although mirror 14 may be mounted on some adjustable base 22 for individual pilot fine alignment with the upper mirror (see FIG. 4).

In operation, a field of view in mirror 12 is reflected onto mirror 14 through a transparency 18, which transparency is protected from exposure to high speed air by rear surface 24 of mirror 12 with the VAS system stowed. Mirror 12 is deployed by any convenient means and could well be contained in streamlined packaging with forward facing transparencies, deployable with electrical motors or other means. The simplified deployment system 16, shown for illustration only, could be any of a variety of deployment means used in high speed aerospace vehicles. Where such a system needs use full time, forward facing mirror 12 may be built into a permanent position, behind transparencies (see FIG. 8), or orientable at will by a vehicle operator (see FIG. 7).

It will be readily apparent to those familiar with aerodynamic surfaces and the characteristics of high speed airflow that appreciable structural support for the external mirror elements of VAS's disclosed herein will be required to preclude vibration and fixture of the same. System 16 is schematic and symbolic only of a variety of deployment mechanisms available for use with the invention.

Figure 8:
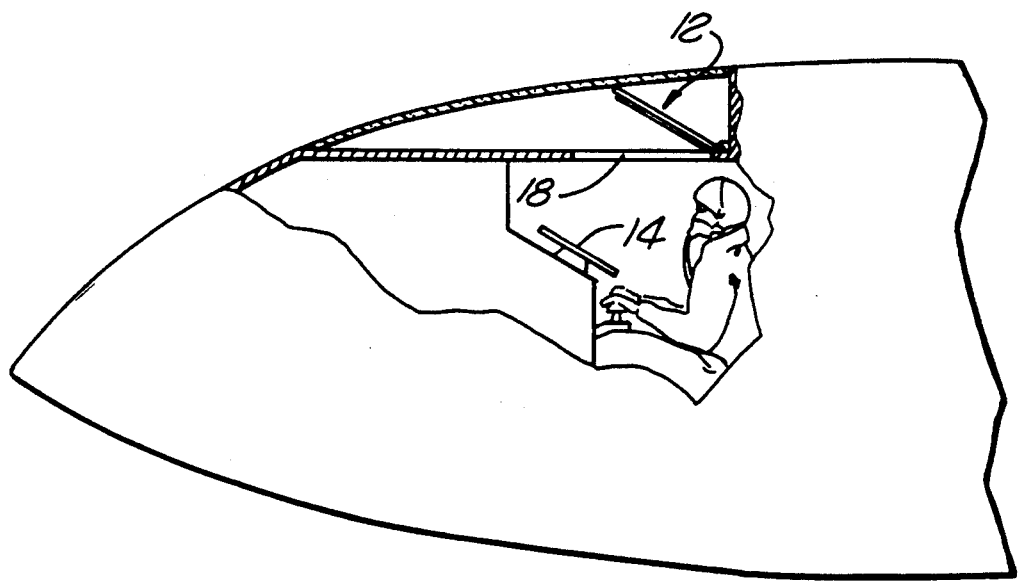
FIG. 8 presents an external mirror configuration behind a transparent canopy.

Although the primary use of the VAS proposed herein is by high speed aerospace vehicles whereon the upper mirror is deployable at lower speeds, a fixed mirror 12, with transparent streamlined housing is also contemplated (see FIG. 8). In such a system, the pilot, in his submerged cockpit, still enjoys safety from bird strike or transparency damage while maintaining full time use of the VAS at whatever speed the craft is designed to operate.

Emphasis herein is placed on a deployable external mirror 12 and such an item is the preferred embodiment of the invention.

Critical to the invention is planetary of mirrors 12 and 14 which planetary preserves non-distorted, three dimensional cues for the operator. By simple movement of his head from side to side or up and down, the operator can obtain the same cues for control as he would by having a large transparency to view through, without the disadvantages associated with large transparencies.

Figure 2:
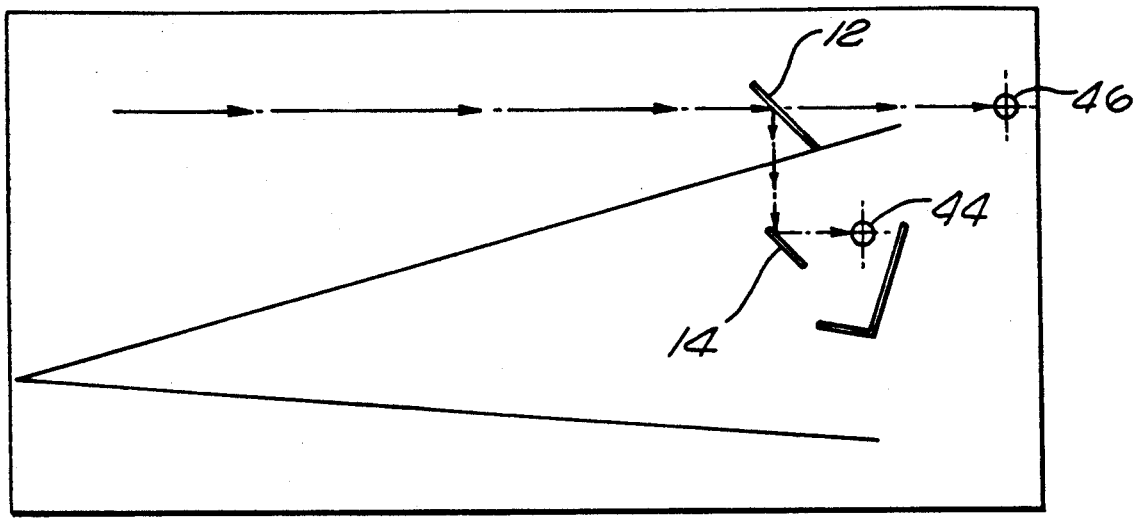
FIG. 2 is a schematic view of the light path in the vision augmentation system.
Figure 4A:
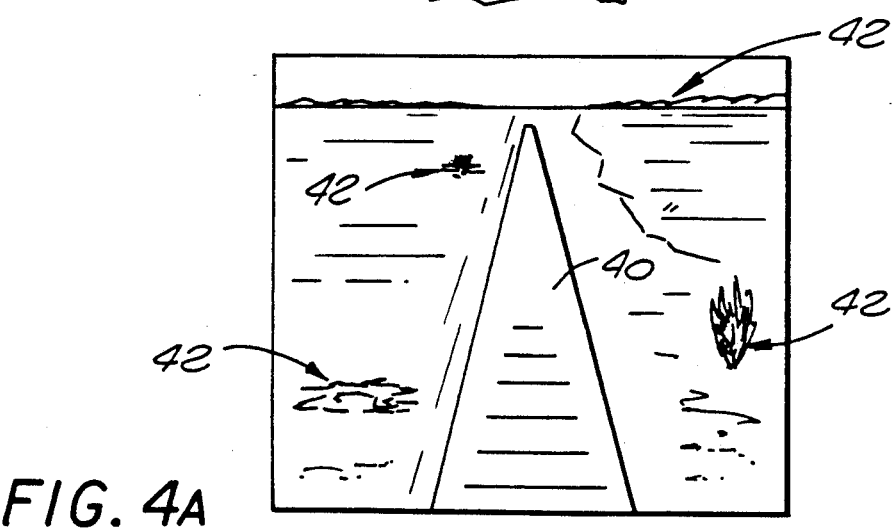
FIG. 4a is a pictorial presentation of the display presented in the internal mirror.
Figure 6:
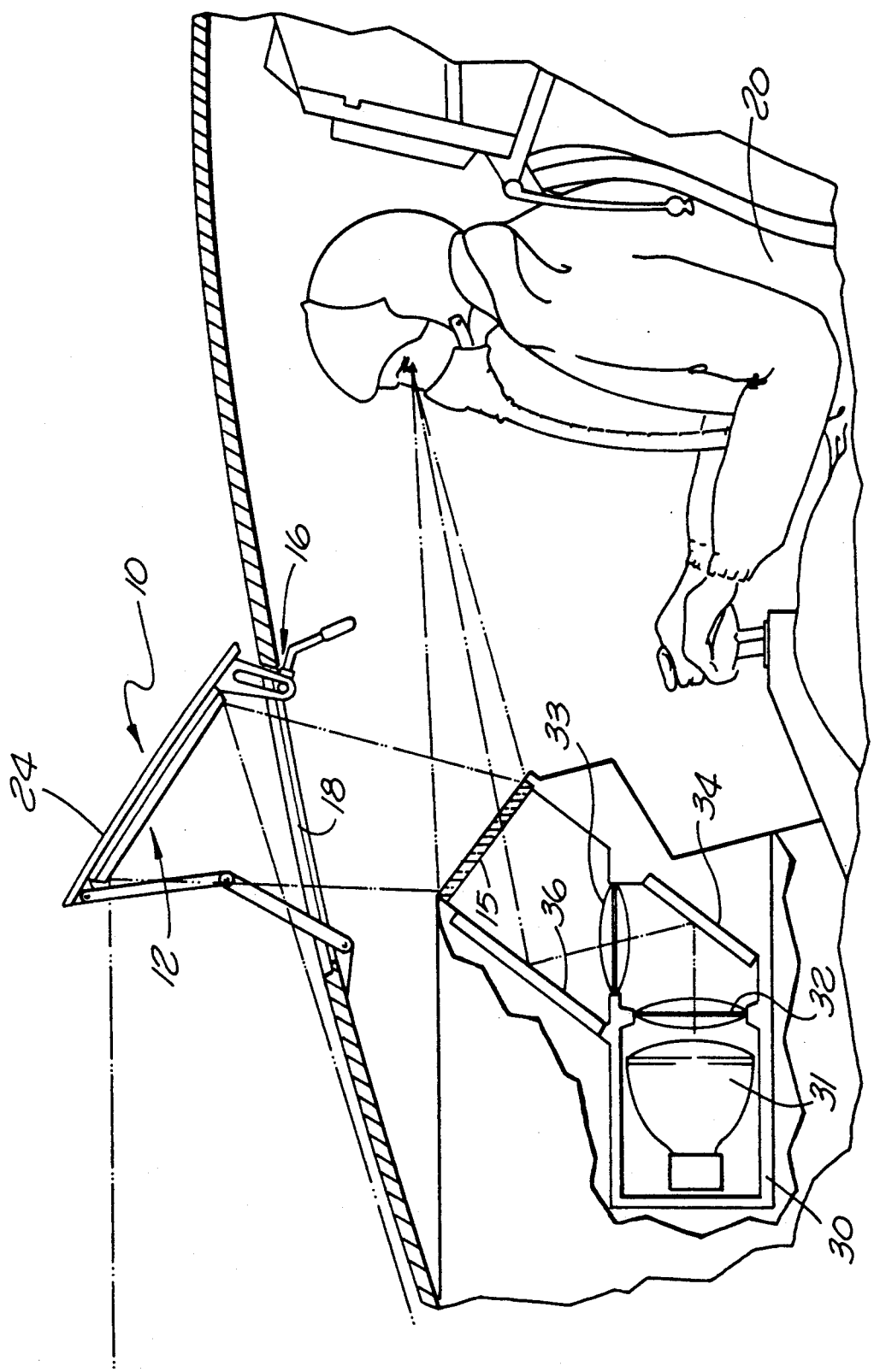
FIG. 6 is a sectional view of the basic system of the invention augmented by a Heads Up Display (HUD) system.

A typical scene viewed by pilot 20 on mirror 14 is presented in FIG. 4a. A runway 40 with lateral cues 42 such as grass patches, taxi ramps and mountains, is presented in the same sense of view as the pilot would experience on an approach viewed through a front facing windshield. FIG. 2 diagrams this aspect of the pilot's view as being that from an apparent eye 46 behind upper mirror 12 at his cockpit position of "design eye" 44. The view available at design eye 44 is that which could be viewed from apparent eye 46 position. By moving his head, i.e. design eye 44, from right to left, the same vista is presented has the apparent eye 46 been moved the same distance from its original position.

Figure 3A:
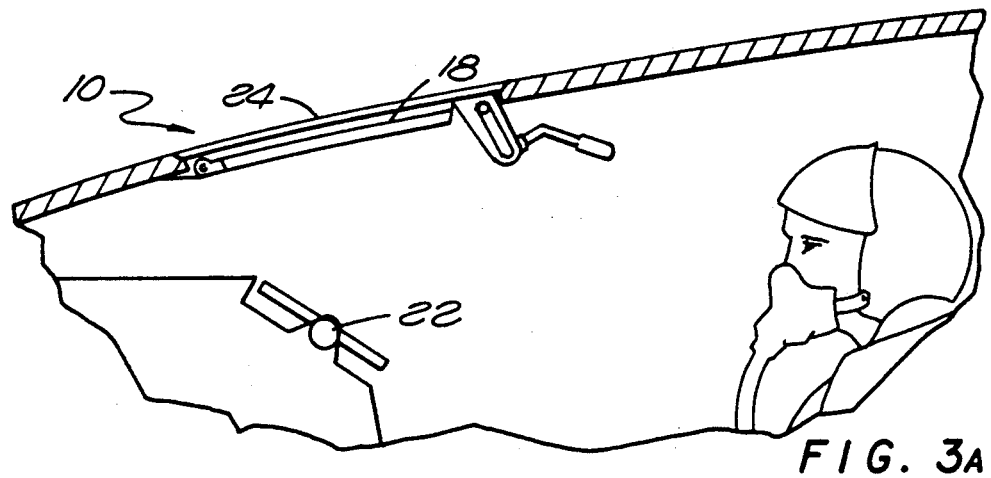
FIGS. 3A, 3B and 3C, respectively comprises three views of the external mirror in a deployment sequence.
Figure 3B:
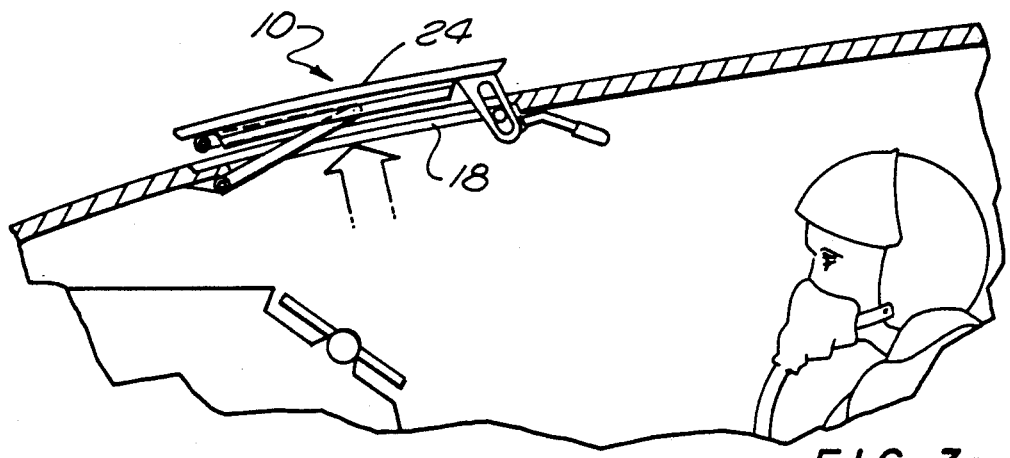
Figure 3C:
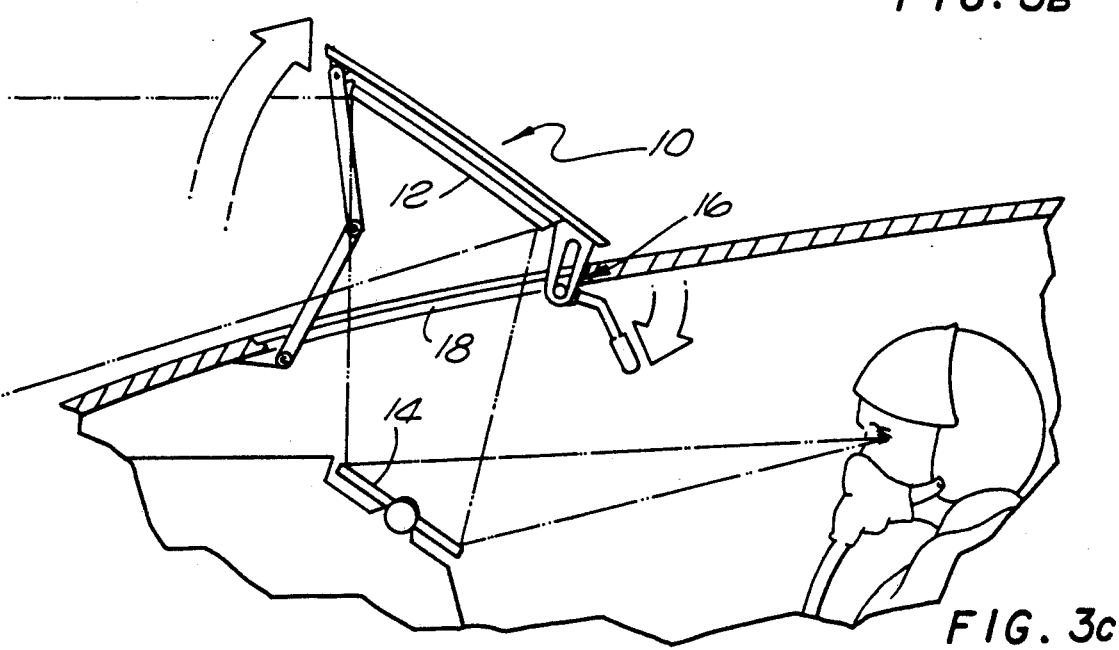

FIG. 3 presents an embodiment of the VAS using a Heads Up Display (HUD) 30 to augment data available to the pilot. Critical instrumentation readouts are presented on cathode ray tube 31 as in conventional HUD systems. These data (i.e. "images") are passed through collimating optics 32 and reflected from mirror 34 to mirror 36 through additional optics conditioner means 33. From mirror 36, data on the selected parameters is passed through partially transparent lower mirror 15 (counterpart of mirror 14 in a non-HUD embodiment) and displayed to pilot 20 as an overlay to the visual cues from upper mirror 12. The HUD data remain fixed on mirror 15 as the pilot moves his head for dimensional clues and depth gauging, i.e., the runway scene shifts as he moves his head, but the instrumentation data are displayed in a fixed area of his viewing screen 15.

Figure 5:
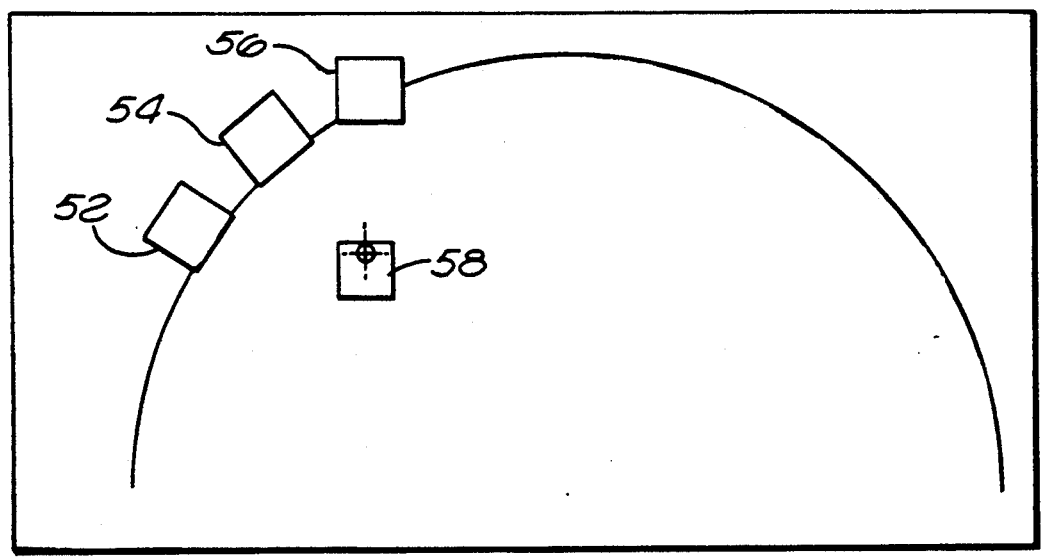
FIG. 5 is a schematic view of possible positions along the periphery of the vehicle body for external mirror placement.

Position of the upper, or external, mirror can be anywhere along the periphery of the vehicle as long as there is a clear light of sight between the upper or external, and lower, or internal, mirror. Actual positioning of the external mirror will depend on the field of view requirements and forward nose configuration of the specific vehicle. FIG. 5 shows possible positions 52, 54, 56 for an external mirror along the aircraft fuselage. The external mirror is placed in the desired location to reflect a field of view through a transparency in that fuselage, onto the internal mirror 58. The internal mirror is oriented appropriately to match the external mirror with the planes of both mirrors being parallel.

Figure 7:
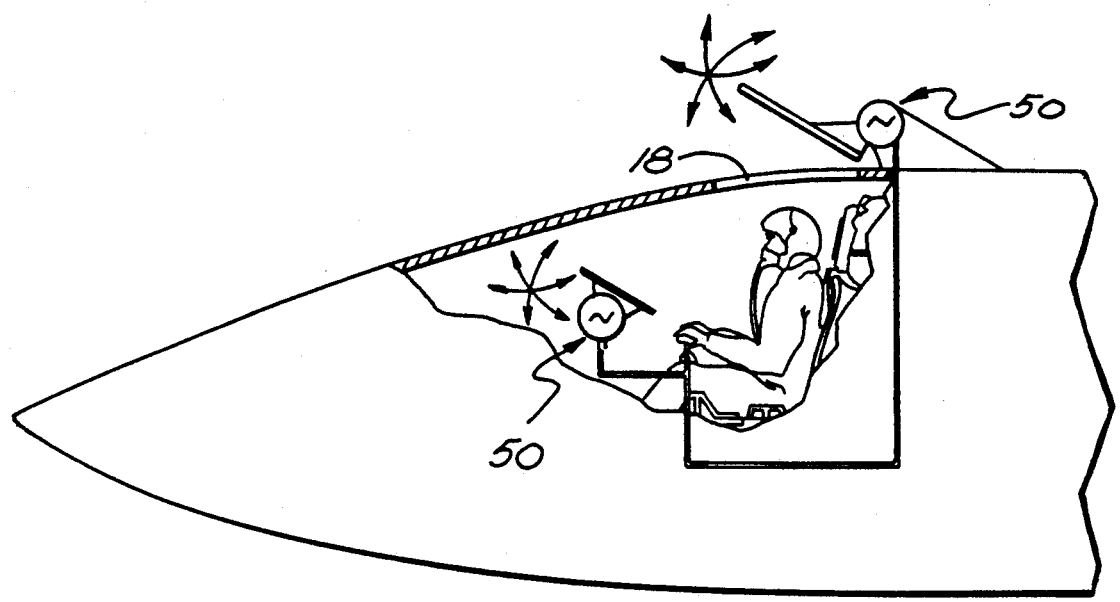
FIGS. 7 presents a schematic view of an angularly adjustable external mirror system.

While the above preferred embodiments speak of fixed and deployable mirrors 12, 14, 15, 52, 54, 58 and 56, the principal thrust of the invention is use of plane mirrors to augment vision of a submerged operator and it is within the contemplation of the invention that upper mirrors and lower mirrors may be moved or driven so that their planes remain generally parallel while the fields of view of the upper mirror are changed by altering its orientation. Simple servo systems 50, see FIGS. 7, are usable for such VAS's and orientations of both upper and lower mirrors can be controlled by simple switch action of the pilot, much as control surfaces are trimmed by tab control buttons 60 on the control stick (FIG. 4).

One of the significant advantages of the within VAS is that it eliminates the need for large forward facing transparencies, viz "windshields" in high performance aerospace craft and retains the advantages of three dimensional viewing at critical periods of flight such as landing and takeoff.

We claim:

1. A vision augmentation system for a high performance aircraft, comprising:
   (a) a transparency constructed in a portion of the fuselage of said aircraft at a desired location;
   (b) an adjustable external mirror positionable at,
      (i) a stowed position adjacent to said transparency and substantially flush with the outer skin of the fuselage so as to maintain the aerodynamic integrity of the aircraft during high speed flight, and
      (ii) at least one deployed position for reflecting light received from a field of view exterior to the aircraft, during low speed travel;
   (c) means for positioning said external mirror; and
   (d) cockpit mirror means, located internal the aircraft, for receiving light reflected from the external mirror and through the transparency when the external mirror is deployed, said cockpit mirror means being so constructed and arranged to redirect the reflected light toward crewmember of the aircraft thus providing a real-time, three dimensional view from the vantage of an "apparent eye" position located aft of the external mirror, the vision augmentation system preserving depth perception cues.

2. The system of claim 1 wherein said external mirror and said cockpit mirror means are substantially parallel.

3. The system of claim 2 wherein said cockpit mirror means is angularly adjustable.

4. The system of claim 3 wherein said external mirror is angularly adjustable.

5. The system of claim 2 wherein said cockpit mirror means comprises a semi-transparent mirror with associated instrumentation displayed thereon in addition to said field of view.

* * * * *